R. C. RAHM.
DRIVE AND STOP MECHANISM FOR BRAIDING MACHINES.
APPLICATION FILED MAR. 21, 1919.
1,337,270.  Patented Apr. 20, 1920.
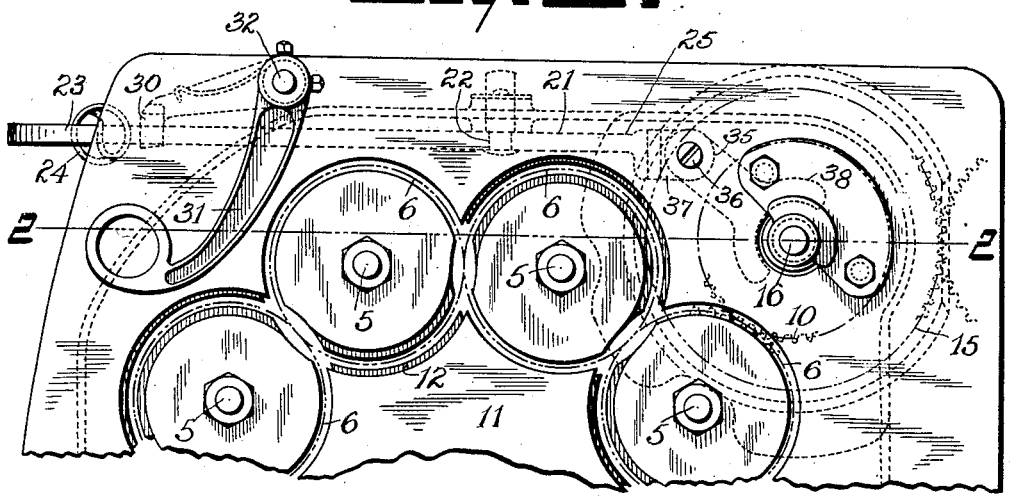
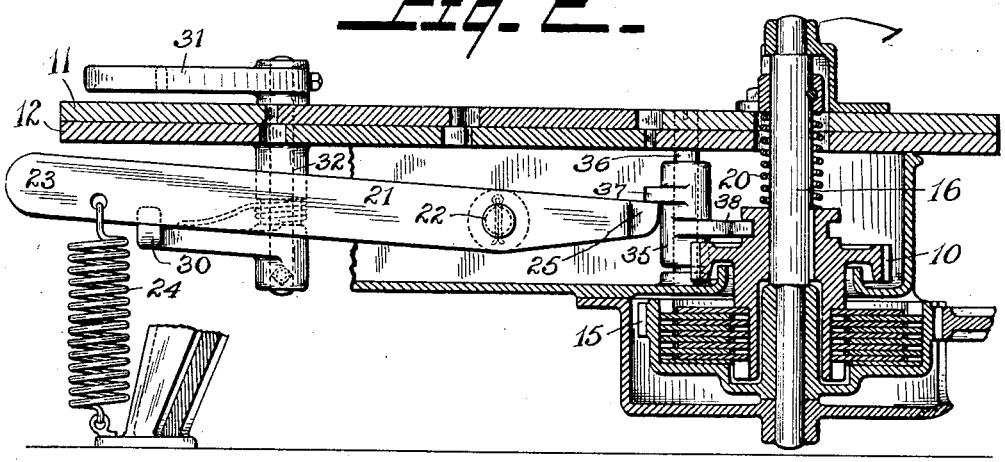
Robert Carl Rahm, Inventor

UNITED STATES PATENT OFFICE.

ROBERT CARL RAHM, OF WYOMISSING, PENNSYLVANIA.

DRIVE AND STOP MECHANISM FOR BRAIDING-MACHINES.

1,337,270.

Specification of Letters Patent.　　Patented Apr. 20, 1920.

Application filed March 21, 1919. Serial No. 284,128.

*To all whom it may concern:*

Be it known that I, ROBERT CARL RAHM, a citizen of the United States, residing at Wyomissing, in the county of Berks and State of Pennsylvania, have invented certain new and useful Improvements in Drive and Stop Mechanism for Braiding-Machines, of which the following is a specification.

My invention relates particularly to braiding machines, and consists in an improved friction-clutch drive and stop mechanism whereby the operation of the braiding carriers is conveniently controlled by the operator or automatically stopped by the breaking of a yarn; as fully described in connection with the accompanying drawing and specifically defined in the subjoined claims.

Figure 1 is a partial plan view of a braiding machine bed having my improved mechanism applied thereto in preferred manner.

Fig. 2 is a cross-sectional view on the line 2—2 of Fig. 1.

The drawing indicates a braiding machine bed formed with carrier race-ways extending as usual around a series of carrier-drive-gear posts 5, 5, 5; the carriers being omitted, and the gears being indicated only by their pitch circles 6, 6, 6, arranged tangential to each other and to the common drive gear 10 forming part of the mechanism to which my present invention relates. The bed construction illustrated indicates the arrangement of the race-ways for the oppositely moving carriers in the different planes of a double top plate 11, 12 such as is fully set forth in my pending application Ser. No. 262,789 filed Nov. 16, 1918, but it will be understood that the present improvements are equally applicable to machines of ordinary structure.

In my improved drive and stop mechanism the common carrier drive gear 10 referred to, is arranged in friction-clutch engagement with a main driver 15 mounted upon the same post 16, as usual; said main gear being continuously driven, but its motion being made effective or ineffective in driving the carriers by engaging or releasing the gear 10 by means of any suitable friction clutch construction, such as the disk type illustrated. The splined gear 10 is normally pressed into engagement with the main driver 15 by a spring 20, and is released by an axial movement thereof against the tension of said spring. This axial movement is effected by a clutch lever 21, which is fixedly pivoted intermediately at 22. The end portion 23 of this lever is extended to a convenient point for handling by the operator, and is normally drawn downward by a releasing spring 24 so as to exert upon the clutch-operating opposite end 25 of the lever a force sufficient to overcome the pressure of the gear-engaging spring 20. This normal releasing action of the spring 24 is made ineffective by providing a clutch-lever catch 30, upon which the raised end portion 23 of the lever is supported during normal operation of the machine by the engaged gears 10 and 15; but such catch is arranged to be moved out of supporting position, either at the will of the operator, or automatically upon the breaking of a yarn, by means of a stop lever 31 operatively connected with the clutch-lever catch 30 by means of a common pivotal shaft 32 as shown. This stop lever 31 is located as usual adjacent the path of the braiding carriers so as to be engaged by a drop-weight on the latter when the yarn breaks, or it may be conveniently moved by the operator at any time desired to stop the machine. In either case the movement of the catch 30 from its supporting position permits the outer end 23 of the clutch lever to be lowered by the fixed tension of the releasing spring 24, thereby raising the operating end 25 thereof to effect the lifting of the gear out of its clutch engagement with the main gear 15. This action upon the gear 10 is effected as indicated through an interposed clutch engaging sleeve 35 which is vertically guided upon a fixed post 36 and provided with projections or arms 37 and 38 arranged in proper relative positions for engaging the clutch lever end 25 and the clutch gear 10 respectively.

What I claim is:—

1. In a braiding machine, an automatic stop mechanism comprising a carrier-contacting stop lever carrying a clutch-lever catch, a clutch lever having an operating spring connected thereto, and a carrier drive mechanism comprising a main gear and a spring-pressed gear having a friction-clutch engagement with said main gear and operatively connected to said clutch lever.

2. In a braiding machine, a drive and stop mechanism comprising a main drive gear, a carrier-drive gear having a friction clutch engagement with said main gear, a spring arranged to normally press said gears into engagement, a guided clutch-engaging sleeve, a clutch lever operative on said sleeve to disengage said spring-engaged gears, and a carrier-contacting stop lever carrying a clutch-lever catch.

In testimony whereof I affix my signature.

ROBERT CARL RAHM.